United States Patent
Hongo et al.

(10) Patent No.: US 7,384,676 B2
(45) Date of Patent: Jun. 10, 2008

(54) COATING COMPOSITION, HARD COAT FILM, AND OPTICAL DISK

(75) Inventors: Yuki Hongo, Tokyo (JP); Satoru Shoshi, Koshigaya (JP); Kazuya Katoh, Arlington, MA (US); Hideo Senoo, Kawaguchi (JP)

(73) Assignee: LINTEC Corporation, Tokyo (JP)

( * ) Notice: Subject to any disclaimer, the term of this patent is extended or adjusted under 35 U.S.C. 154(b) by 532 days.

(21) Appl. No.: 10/969,329

(22) Filed: Oct. 21, 2004

(65) Prior Publication Data
US 2005/0147809 A1 Jul. 7, 2005

(30) Foreign Application Priority Data
Oct. 31, 2003 (JP) ............................. 2003-373121

(51) Int. Cl.
*B32B 3/02* (2006.01)
(52) U.S. Cl. .................... 428/64.1; 428/64.4; 428/404; 430/270.11
(58) Field of Classification Search ............... 428/64.1, 428/64.4, 404, 405; 427/446; 430/270.12
See application file for complete search history.

(56) References Cited

U.S. PATENT DOCUMENTS

| | | | | |
|---|---|---|---|---|
| 7,132,146 | B2 * | 11/2006 | Itoh et al. .................... | 428/64.1 |
| 7,141,298 | B2 * | 11/2006 | Shoshi et al. ................ | 428/331 |
| 2003/0065050 | A1 | 4/2003 | Yamaguchi et al. | |
| 2003/0100630 | A1 | 5/2003 | Yamaguchi et al. | |

FOREIGN PATENT DOCUMENTS

| | | |
|---|---|---|
| CN | 1416454 | 5/2003 |
| EP | 0 867 469 | 9/1998 |
| EP | 0 867 469 A2 | 9/1998 |
| EP | 1 350 816 | 10/2003 |
| EP | 1 350 816 A1 | 10/2003 |
| JP | 2002-234906 | 8/2002 |
| WO | WO 00/47666 | 8/2000 |

OTHER PUBLICATIONS

Office Communication issued from European Patent Office issued on Mar. 24, 2003 for the corresponding European patent application No. 04256716.4-1214 (a copy thereof).
European Search Report dated Mar. 24, 2005 in corresponding European patent application No. EP 04 25 6716.

* cited by examiner

*Primary Examiner*—Elizabeth Mulvaney
(74) *Attorney, Agent, or Firm*—Posz Law Group, PLC

(57) ABSTRACT

One side of a substrate film 11 is coated with a coating composition containing (A) a reactive particle produced by chemically bonding an organic compound having at least one polymerizable unsaturated group in its molecule to an inorganic oxide particle, (B) a monomer or oligomer of an organic compound having at least two polymerizable unsaturated groups in its molecule, (C) an organic compound with a weight average molecular weight of at least 1500 and having at least one polymerizable unsaturated group in its molecule, and, if desired, (D) a siloxane compound having a dimethylsiloxane skeleton, and the coating composition is cured by irradiation with ionizing radiation to form a hard coat layer 12 with a thickness of 2 to 20 μm. This provides a hard coat film having adequate surface hardness and suppressed warpage.

8 Claims, 1 Drawing Sheet

COATING COMPOSITION, HARD COAT FILM, AND OPTICAL DISK

TECHNICAL FIELD

This invention relates to a coating composition, a hard coat film, and an optical disk, and more particularly relates to a coating composition with which warpage of the substrate can be suppressed while maintaining the surface hardness after curing, to a hard coat film with adequate surface hardness and suppressed warpage, and to an optical disk whose surface is resistant to scratches and has suppressed warpage.

BACKGROUND ART

With the Blu-ray Disc, which is a next-generation optical disk, just as with ordinary optical disks, a protective film composed of a polycarbonate is bonded to the information recording layer in order to protect this layer. The recorded information on a Blu-ray Disc is extremely large capacity and high density, and even a slight scratch to the protective film can result in errors in the reading or writing of information, so at present Blu-ray Discs are housed in a cartridge to prevent such scratching.

However, a cartridgeless type bare disk is desired in order to make the Blu-ray Disc a more compact medium and to reduce manufacturing costs.

To this end, it is possible to form a hard coat layer on the protective film used for the information recording layer, as disclosed in Japanese Laid-Open Patent Application 2003-157579, but with protective films featuring a conventional hard coat layer, considerable warpage is caused by the curing shrinkage of the hard coating agent, which leads to warpage of the disk and problems with signal characteristics. Therefore, to suppress this warpage, the hard coat layer had to be made thinner, and more specifically, the thickness had to be reduced to between 1 and 3 µm. With such a thin hard coat layer, however, the surface is not hard enough to prevent scratching.

It is also possible to use the resin composition disclosed in Japanese Laid-Open Patent Application 2000-273272 as a hard coating agent, but here again, the hard coat layer has to have a certain thickness in order to achieve an adequate surface hardness in the resulting hard coat layer, and it is therefore difficult to suppress warpage in the protective films and in the resulting disks.

DISCLOSURE OF THE INVENTION

The present invention was conceived in light of this situation, and it is an object thereof to provide a coating composition with which warpage of the substrate can be suppressed while maintaining the surface hardness after curing, a hard coat film with adequate surface hardness and suppressed warpage, and an optical disk whose surface is resistant to scratches and has suppressed warpage.

In order to achieve the stated object, the present invention first provides a coating composition containing (A) a reactive particle wherein an organic compound having at least one polymerizable unsaturated group in its molecule is chemically bonded to an inorganic oxide particle, (B) a monomer or oligomer of an organic compound having at least two polymerizable unsaturated groups in its molecule, and (C) an organic compound with a weight average molecular weight of at least 1500 and having at least one polymerizable unsaturated group in its molecule (Invention 1).

With the above invention (Invention 1), the result of the organic compound (C) with a weight average molecular weight is at least 1500 being contained is that shrinkage can be reduced during curing, while maintaining a high surface hardness of the coating layer obtained by curing the present coating composition. Therefore, even if the coating layer is formed thicker than usual so that the surface hardness will be increased, since there is little curing shrinkage of the coating layer, warpage of the substrate (what is coated) can be suppressed.

The coating composition pertaining to the present invention (invention 1) preferably further contains (D) a siloxane compound having a dimethylsiloxane skeleton (invention 2). If the siloxane compound (D) is contained, it will impart slip properties to the resulting coating layer, which increases scratch resistance and also makes the coating layer less prone to fouling and easier to clean.

In the above inventions (inventions 1 and 2), it is preferable for the organic compound (C) to be an acrylate (invention 3). Using an acrylate as the organic compound (C) results in the effects of the present invention as given above being more pronounced.

In the above inventions (inventions 1 to 3), when the present coating composition is used to form a coating layer (hard coat layer) for an optical film or an optical product or the like, it is preferable for the inorganic oxide particle of the above-mentioned reactive particle (A) to be a silica particle (invention 4). Using silica particles allows the optically transparency of the coating layer to be kept high.

In the above inventions (inventions 1 to 4), it is preferable for the monomer or oligomer of the organic compound (B) to be a monomer or oligomer of a (meth)acrylic ester (invention 5).

The present invention secondly provides a hard coat film, comprising a substrate film and a hard coat layer with a thickness of 2 to 20 µm, produced by coating at least one side of the substrate film with the coating composition according to any of the above-mentioned coating compositions (inventions 1 to 5), and curing the coating composition (invention 6).

Because the hard coat film pertaining to the above invention (invention 6) makes use of the above-mentioned coating composition, it has adequate surface hardness, and warpage is suppressed.

In the above invention (invention 6), when this hard coat film is used as an optical film, it is preferable for the substrate film to be an optically transparent film composed of a polycarbonate, cycloolefin-based polymer or a polymethyl methacrylate (invention 7).

The third present invention provides an optical disk comprising the above-mentioned hard coat film (inventions 6 and 7) (invention 8).

Because the optical disk pertaining to the above invention (invention 8) makes use of the above-mentioned hard coat film, its surface is resistant to scratching and warpage is suppressed.

With the coating composition of the present invention, warpage of the substrate can be suppressed while maintaining the surface hardness after curing. Also, the hard coat film of the present invention has adequate surface hardness and suppressed warpage. Further, the optical disk of the present invention has a surface that is resistant to scratches and has suppressed warpage, which results in a lower rate of errors due to scratches or warping.

BEST MODE FOR CARRYING OUT THE INVENTION

Figure 1:
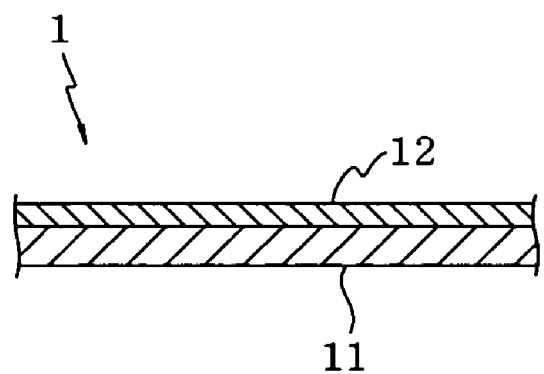
FIG. 1 is a cross section of the hard coat film pertaining to an embodiment of the present invention.

Embodiments of the present invention will now be described.

Coating Composition

The coating composition pertaining to this embodiment contains (A) a reactive particle wherein an organic compound (a) having at least one polymerizable unsaturated group in its molecule is chemically bonded to an inorganic oxide particle, (B) a monomer or oligomer of an organic compound having at least two polymerizable unsaturated groups in its molecule, (C) an organic compound with a weight average molecular weight of at least 1500 and having at least one polymerizable unsaturated group in its molecule, and, if desired, (D) a siloxane compound having a dimethylsiloxane skeleton.

A. Reactive Particles

For example, the reactive particles (A) disclosed in Japanese Laid-Open Patent Application 2000-273272 can be used as the reactive particles (A). It will be described in specific terms below.

Examples of the inorganic oxide particle of the reactive particle (A) include particle of silica, alumina, zirconia, titanium oxide, zinc oxide, germanium oxide, indium oxide, tin oxide, antimony oxide, cerium oxide, and so forth. These particles can be used singly or in combinations of two or more kinds.

When the present coating composition is used to form a coating layer (hard coat layer) for an optical film or an optical product or the like, it is preferable for the inorganic oxide particles to be silica particles that are highly optically transparent and absorb little light.

The average size of the inorganic oxide particles is preferably from 0.001 to 2 μm, with 0.001 to 0.2 μm being particularly favorable, and 0.001 to 0.1 μm being better yet. If the average size of the inorganic oxide particles is over 2 μm, there may be a decrease in the optically transparency of the coating layer obtained by curing the present coating composition, or the surface smoothness of the coating layer may suffer.

The inorganic oxide particles may be in any of various forms, such as spherical, hollow, porous, pellets, sheets, fibers, or indeterminate form, but a spherical form is particularly good.

The specific surface area (the BET specific surface area using nitrogen) of the inorganic oxide particles is preferably 10 to 1000 m²/g, with 100 to 500 m²/g being particularly favorable.

An organic compound (a) having at least one polymerizable unsaturated group in its molecule is bonded to the above-mentioned inorganic oxide particles in the reactive particles (A). Examples of the polymerizable unsaturated group had by the organic compound (a) include an acryloyl group, methacryloyl group, vinyl group, propenyl group, butadienyl group, styryl group, ethynyl group, cinnamoyl group, maleate group, and acrylamide group.

There are no particular restrictions on the number of polymerizable unsaturated groups in the organic compound (a), as long as there is at least one in the molecule, but usually there are from 1 to 4.

The organic compound (a) preferably contains a group expressed by the formula [—X—C(=Y)—NH—] (where X is NH, O, or S, and Y is O or S) in addition to the above-mentioned polymerizable unsaturated group. It is also preferable for the organic compound (a) to be a compound that has a silanol group in its molecule, or a compound that produces a silanol group when hydrolyzed.

The compounds expressed by the following formula (1) are specific favorable examples of this organic compound (a).

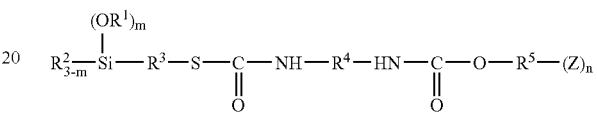

(1)

In Formula 1, $R^1$ and $R^2$ may be the same or different, and are each a hydrogen atom or a $C_1$ to $C_8$ alkyl group or aryl group. Examples of such functional groups include a methyl group, ethyl group, propyl group, butyl group, octyl group, phenyl group, and xylyl group.

Examples of groups expressed by the formula $[(R^1O)_m R^2_{3-m}Si—]$ include a trimethoxysilyl group, triethoxysilyl group, triphenoxysilyl group, methyldimethoxysilyl group, and dimethylmethoxysilyl group, of which a trimethoxysilyl group or triethoxysilyl group is preferred. m here is an integer from 1 to 3.

$R^3$ is a divalent organic group having a $C_1$ to $C_{12}$ aliphatic or aromatic structure, and may include a linear, branched, or cyclic structure. Examples of this organic group include a methylene group, ethylene group, propylene group, butylene group, hexamethylene group, cyclohexylene group, phenylene group, xylylene group, and dodecamethylene group, of which a methylene group, propylene group, cyclohexylene group, or phenylene group is preferred.

$R^4$ is a divalent organic group, and is usually selected from among divalent organic groups having a molecular weight of 14 to 10,000, and preferably 76 to 500. Examples of divalent organic groups include linear polyalkylene groups such as hexamethylene, octamethylene, and dodecamethylene; alicyclic or polycyclic divalent organic groups such as cyclohexylene and norbornylene; divalent aromatic groups such as phenylene, naphthalene, biphenylene, and polyphenylene; and these groups that have been substituted with an alkyl group or aryl group. These divalent organic groups may include atomic groups containing elements other than carbon and hydrogen atoms, and may also include polyether bonds, polyester bonds, polyamide bonds, polycarbonate bonds, and groups expressed by the formula [—X—C(=Y)—NH—] (where X is NH, O, or S, and Y is O or S).

$R^5$ is an (n+1)-valent organic group, and is preferably selected from among linear, branched, or cyclic saturated hydrocarbon groups or unsaturated hydrocarbon groups. Here, n is preferably an integer from 1 to 20, with an integer from 1 to 10 being particularly favorable, and an integer from 1 to 5 being even better.

Z is a monovalent organic group having in its molecule a polymerizable unsaturated group capable of undergoing an intermolecular crosslinking reaction in the presence of an active radical species. Examples of such organic groups include an acryloyl(oxy) group, methacryloyl(oxy) group, vinyl(oxy) group, propenyl(oxy) group, butadienyl(oxy) group, styryl(oxy) group, ethynyl(oxy) group, cinnamoyl (oxy) group, maleate group, acrylamide group, and methacrylamide group, of which an acryloyl(oxy) group or methacryloyl(oxy) group is preferred.

The reactive particles (A) can be manufactured by reacting the above-mentioned inorganic oxide particles with the organic compound (a). It is believed that a component capable of reacting with an organic compound is present on the surface of the above-mentioned inorganic oxide particles, and when the organic compound (a) is mixed with powdered inorganic oxide particles or a solvent-dispersed sol of inorganic oxide particles, either in the presence or absence of water, then heated and agitated, the surface component of the inorganic oxide particles reacts with the organic compound (a) to produce the reactive particles (A).

The reactive particles (A) contained in the coating composition pertaining to this embodiment increase the hardness of the coating layer obtained by curing the present coating composition, and impart scratch resistance to the coating layer.

The amount (as solids) in which the reactive particles (A) are contained in the coating composition is preferably 5 to 80 wt %, and particularly 10 to 70 wt %, versus a 100 wt % combined amount of the reactive particles (A), the monomer or oligomer of an organic compound (B), the organic compound (C), and the siloxane compound (D).

If the reactive particles (A) are contained in an amount less than 5 wt %, the resulting coating layer may not be hard enough, and if the reactive particles (A) content is over 90 wt %, the curability of the coating composition may decrease.

B. Monomer or Oligomer of an Organic Compound Having at Least Two Polymerizable Unsaturated Groups in its Molecule Examples of the polymerizable unsaturated groups of this organic compound include an acryloyl group, methacryloyl group, and epoxy group, of which an acryloyl group or methacryloyl group is preferred.

Specifically, the monomer or oligomer of an organic compound (B) is preferably a monomer or oligomer of a (meth)acrylic ester. Examples of (meth)acrylic esters include 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth) acrylate, trimethylolpropane tri(meth)acrylate, dipentaerythritol tri(meth)acrylate, propionic acid-modified dipentaerythritol tri(meth)acrylate, pentaerythritol tri(meth) acrylate, pentaerythritol tetra(meth)acrylate, propylene oxide-modified trimethylolpropane tri(meth)acrylate, tris (acryloxyethyl)isocyanurate, propionic acid-modified dipentaerythritol penta(meth)acrylate, dipentaerythritol hexa(meth)acrylate, caprolactone-modified dipentaerythritol hexa(meth)acrylate, and other such polyfunctional acrylates. These polyfunctional acrylates can be used singly or in combinations of two or more kinds.

When a (meth)acrylic ester is used as an oligomer, its weight average molecular weight is preferably about 1000 or less.

There are no particular restrictions on the number of polymerizable unsaturated groups in the above-mentioned organic compound, as long as there are at least two in the molecule, but usually there are from 2 to 6.

By containing the monomer or oligomer of an organic compound (B) in the coating composition pertaining to this embodiment, scratch resistance is imparted to the hard coat layer obtained by curing the present coating composition, and in particular, the resulting hard coat layer has better scuff resistance.

The amount in which the monomer or oligomer of an organic compound (B) is contained in the coating composition is preferably 5 to 70 wt %, and particularly 10 to 60 wt %, versus a 100 wt % combined amount of the reactive particles (A), the monomer or oligomer of an organic compound (B), the organic compound (C), and the siloxane compound (D).

C. Organic Compound with a Weight Average Molecular Weight of At Least 1500 and Having at Least One Polymerizable Unsaturated Group in its Molecule Examples of the polymerizable unsaturated groups of this organic compound (C) include an acryloyl group, methacryloyl group, and epoxy group, of which an acryloyl group or methacryloyl group is preferred.

Specifically, the organic compound (C) is preferably an acrylate with a weight average molecular weight of at least 1500. Examples of acrylates include urethane acrylate, polyester acrylate, and polyether acrylate. Even more preferable are urethane acrylate, polyester acrylate, and polyether acrylate having a (meth)acryloyl group at both terminals and having in its main chain a urethane, polyester, or polyether skeleton that does not participate in polymerization. The effect of using a urethane acrylate is that the hard coat layer is particularly resistant to cracking. These acrylates can be used singly or in combinations of two or more kinds.

It is preferable for the urethane acrylate to be obtained, for example, by using a (meth)acrylic acid to esterify the hydroxyl groups at both ends of a urethane polymer obtained by reacting a polyether polyol or a polyester polyol with a polyisocyanate.

It is preferable for the polyester acrylate to be obtained, for example, by using a (meth)acrylic acid to esterify the hydroxyl groups of a polyester polymer having hydroxyl groups at both ends and obtained by the condensation of a polyvalent carboxylic acid and a polyhydric alcohol, or by using a (meth)acrylic acid to esterify the hydroxyl groups at the ends of a polymer obtained by adding an alkylene oxide to a polyvalent carboxylic acid.

It is preferable for the polyether acrylate to be obtained, for example, by reacting the carboxyl groups of a (meth) acrylic acid with the epoxy groups at both ends of an epoxy resin having a polyether skeleton in its main chain.

There are no particular restrictions on the number of polymerizable unsaturated groups in the organic compound (C), as long as there is at least one in the molecule, but usually there are from 1 to 4.

The weight average molecular weight of the organic compound (C) is at least 1500, with 2000 to 30,000 being preferable, and 3000 to 20,000 being particularly favorable.

By containing the organic compound (C) in the coating composition pertaining to this embodiment, shrinkage during curing can be reduced while maintaining a high surface hardness of the coating layer obtained by curing the present coating composition. Specifically, even if the coating layer is formed thicker than usual in order to increase the surface hardness, the small amount of curing shrinkage of the coating layer means that there can be less warpage of the substrate (what is being coated).

The amount in which the organic compound (C) is contained in the coating composition is preferably 10 to 90 wt %, and particularly 10 to 50 wt %, versus a 100 wt % combined amount of the reactive particles (A), the monomer or oligomer of an organic compound (B), the organic compound (C), and the siloxane compound (D). It is also preferable for the blend ratio (weight ratio) between the monomer or oligomer of an organic compound (B) and the organic compound (C) to be between 1:2 and 10:1.

D. Siloxane Compound Having a Dimethylsiloxane Skeleton

Examples of the siloxane compound having a dimethylsiloxane skeleton (D) include the polydimethylsiloxane expressed by the following Formula 2, as well as modified polydimethylsiloxanes obtained by substituting the methyl group at one or both ends or in the side chain of a polydimethylsiloxane with another functional group, and modified polydimethylsiloxanes obtained by introducing an ionizing radiation-curable group into the molecule. The polydimethylsiloxanes or modified polydimethylsiloxanes can be used singly or in combinations of two or more kinds.

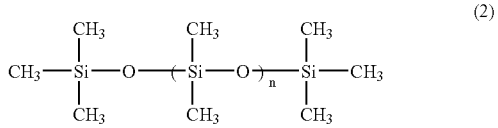
(2)

In Formula 2, n is an integer.

Examples of modified polydimethylsiloxanes include the compounds expressed by the following Formulas 3 to 5.

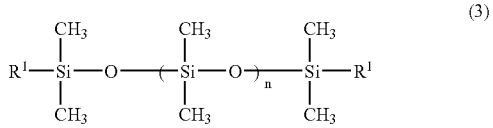
(3)

In Formula 3, n is an integer, and the $R^1$ groups are each independently a hydroxyl group, carboxyalkyl group, alkyl ester thereof, aminoalkyl group, diaminoalkyl group, hydroxyalkyl group, or dihydroxyalkyl group.

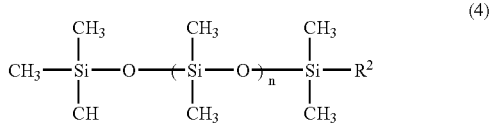
(4)

In Formula 4, n is an integer, and $R^2$ is a hydroxyl group, carboxyalkyl group, alkyl ester thereof, aminoalkyl group, diaminoalkyl group, hydroxyalkyl group, or dihydroxyalkyl group.

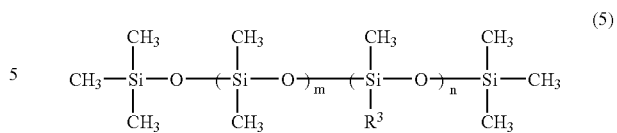
(5)

In Formula 5, m is 0 or an integer of at least 1, n is an integer, and $R^3$ is an aminoalkyl group, diaminoalkyl group, carboxyalkyl group, hydroxyalkyl group, or dihydroxyalkyl group.

Specific examples of the above-mentioned modified polydimethylsiloxanes include polydimethylsiloxane (PS040 made by Chisso; SH28PA made by Toray Dow Corning Silicone), single-terminal silanol-modified polydimethylsiloxane, two-terminal silanol-modified polydimethylsiloxane (PS340.5 and PS-341, molecular weight 3200, made by Chisso), side chain amino-modified polydimethylsiloxane (KF-859 and KF-865 made by Shin-Etsu Silicone), side chain carbinol-modified polysiloxane (SF8428 made by Toray Silicone), side chain carboxy-modified polydimethylsiloxane (X-22-3710 made by Shin-Etsu Silicone), and two-terminal carboxyl-modified polydimethylsiloxane (BY16-750 made by Toray Silicone).

Examples of modified polydimethylsiloxanes obtained by introducing an ionizing radiation-curable group into the molecule include radical addition-type polydimethylsiloxanes having an alkenyl group and mercapto group in their molecule, hydrosilylation-type polydimethylsiloxanes having an alkenyl group and hydrogen atom in their molecule, cationic polymerization-type polydimethylsiloxanes having an epoxy group in their molecule, and radical polymerization-type polydimethylsiloxanes having a (meth)acryl group in their molecule.

Examples of polydimethylsiloxanes having an epoxy group or (meth)acryl group in their molecule include epoxypropoxypropyl-terminated polydimethylsiloxane, an (epoxycyclohexylethyl)methylsiloxane-dimethylsiloxane copolymer, methacryloxypropyl-terminated polydimethylsiloxane, and acryloxypropyl-terminated polydimethylsiloxane. Examples of polydimethylsiloxanes having a vinyl group in their molecule include vinyl-terminated polydimethylsiloxane and vinylmethylsiloxane homopolymers.

The weight average molecular weight of the siloxane compound (D) is preferably 300 to 200,000, with 500 to 20,000 being particularly favorable.

By containing the siloxane compound (D) in the coating composition pertaining to this embodiment, the resulting coating layer has slip properties, scratch resistance (and particularly scuff resistance) is improved, and the coating layer is more resistant to fouling and any dirt is easier to remove.

The amount in which the siloxane compound (D) is contained in the coating composition is usually 0 to 5 wt %, and preferably 0 to 2 wt %, versus a 100 wt % combined amount of the reactive particles (A), the monomer or oligomer of an organic compound (B), the organic compound (C), and the siloxane compound (D).

E. Third Components

The present coating composition may also contain components other than the above-mentioned (A) to (D). Examples of such third components include polymerization initiators, sensitizers, solvents, particles other than the reactive particles (A), and various kinds of additives.

It is preferable for the polymerization initiator to be a radiation polymerization initiator, and it is particularly favorable to use a radiation polymerization initiator containing an aryl ketone having a 1-hydroxycyclohexyl group and/or an aryl ketone having an N-morpholino group. If just an aryl ketone having a 1-hydroxycyclohexyl group is used, then a cured product with little coloration can be formed in a short time. On the other hand, if just an aryl ketone having an N-morpholino group is used, a cured product with high surface hardness can be formed in a short time. If both of these are used, a cured product with little coloration and high surface hardness can be formed in a short time.

When an aryl ketone having a 1-hydroxycyclohexyl group and an aryl ketone having an N-morpholino group are used together, the blend ratio (weight ratio) of the two is preferably from 10:90 to 90:10, with 40:60 to 80:20 being particularly favorable.

Examples of aryl ketones having a 1-hydroxycyclohexyl group include 1-hydroxycyclohexyl phenyl ketone, 1-hydroxycyclohexyl isopropyl phenyl ketone, and 1-hydroxycyclohexyl dodecyl phenyl ketone.

Examples of aryl ketones having an N-morpholino group include 2-methyl-1-[4-(methylthio)phenyl]-2-morpholinopropanone-1,2-methyl-1-[4-(methoxy)phenyl]-2-morpholinopropanone-1,2-methyl-1-[4-(2-hydroxyethoxy)phenyl]-2-morpholinopropanone-1,2-methyl-1-[4-(dimethylamino)phenyl]-2-morpholinopropanone-1,2-methyl-1-[4-(diphenylamino)phenyl]-2-morpholinopropanone-1,2-benzyl-2-dimethylamino-1-[4-(morpholinophenyl)-butanone-1, 3,6-bis(2-methyl-2-morpholinopropionyl)-9-N-octylcarbazole.

The amount in which the polymerization initiator is contained in the coating composition is usually 0 to 20 wt %, and preferably 0.1 to 10 wt %, versus a 100 wt % combined amount of the reactive particles (A), the monomer or oligomer of an organic compound (B), the organic compound (C), and the siloxane compound (D).

Examples of sensitizers include triethylamine, diethylamine, N-methyldiethanolamine, ethanolamine, 4-dimethylaminobenzoic acid, methyl 4-dimethylaminobenzoate, ethyl 4-dimethylaminobenzoate, and isoamyl 4-dimethylaminobenzoate.

A solvent can be used to improve coatability, adjust viscosity, adjust solids concentration, and so forth. Examples of solvents that can be used include alcohols such as methanol, ethanol, isopropanol, butanol, octanol, and so forth; ketones such as acetone, methyl ethyl ketone, methyl isobutyl ketone, cyclohexanone, and so forth; esters such as ethyl acetate, butyl acetate, ethyl lactate, γ-butyrolactone, and so forth; ethers such as ethylene glycol monomethyl ether (methyl cellosolve), ethylene glycol monoethyl ether (ethyl cellosolve), diethylene glycol monobutyl ether (butyl cellosolve), and so forth; aromatic hydrocarbons such as benzene, toluene, xylene, and so forth; and amides such as dimethylformamide, dimethylacetamide, N-methylpyrrolidone, and so forth.

An example of particles other than the reactive particles (A) that can be used include the inorganic oxide particles used as the raw material of the reactive particles (A).

Examples of the above-mentioned various kinds of additives include antioxidants, UV absorbers, light-stabilizers, silane coupling agents, age resister, thermal polymerization inhibitors, colorants, leveling agents, surfactants, storage stabilizers, plasticizers, lubricants, inorganic fillers, organic fillers, wettability improvers, and coating surface improvers.

The coating composition described above is applied to the desired substrate and cured, which forms a hard coat layer on the surface of the substrate. Examples of the substrate (what is coated) include plastic products, metal products, glass products, and stones, but the distinctive effects of the present coating composition will be particularly pronounced when the substrate is a plastic film, plastic sheet, plastic board, or the like. Specifically, a hard coat layer produced from the present coating composition has adequate surface hardness, and even if the layer thickness is increased, warpage of the substrate is suppressed, so the coating is less prone to scratching.

The present coating composition may be applied by a standard method, such as bar coating, knife coating, roll coating, blade coating, die coating, or gravure coating. Once the coating composition has been applied, the coating film is preferably dried at about 50 to 120° C.

The present coating composition can be cured by irradiating a coating film of the coating composition with ionizing radiation. UV rays, an electron rays, or the like is usually used as the ionizing radiation. The ionizing radiation dose will vary with the type of ionizing radiation, but in the case of UV rays, for instance, the amount of light is preferably about 100 to 500 mJ/cm$^2$, and in the case of an electron rays, about 10 to 1000 krad is preferable.

The thickness of the hard coat layer after curing is 2 to 20 μm, and preferably 3 to 10 μm. It will be difficult to obtain the desired surface hardness if the thickness of the hard coat layer is less than 2 μm, but cracks may develop in the hard coat layer if the thickness of the hard coat layer is greater than 20 μm. When a plastic film is to be coated, the thickness of the hard coat layer is preferably 3 to 10 μm, with 5 to 10 μm being particularly favorable. In this case, the plastic film may warp considerably if the thickness of the hard coat layer is over 10 μm.

Hard Coat Film

In this embodiment, a hard coat film for protecting the information recording layer of an optical disk has been described as an example, but the hard coat film of the present invention is not limited to such applications.

As shown in FIG. 1, the hard coat film 1 pertaining to this embodiment comprises a substrate film 11 and a hard coat layer 12 formed on one side of the substrate film 11.

Preferably, the substrate film 11 has sufficient optically transparency with respect to the wavelength band of light used for reading or writing information, is both rigid and flexible enough to manufacture an optical disk with ease, and is stable with respect to temperature so that the optical disk can be stored stably. This substrate film 11 is preferably an optically transparent film composed of a polycarbonate, a cycloolefin-based polymer, or a polymethyl methacrylate, and a film composed of a polycarbonate with good adhesion to the hard coat layer 12 (discussed below) is particularly favorable. When a film composed of a cycloolefin-based polymer is used, it is preferable to subject the side on which the hard coat layer 12 will be formed to a corona discharge treatment in order to improve adhesion to the hard coat layer 12.

The thickness of the substrate film 11 is determined according to the type of optical disk or the thickness of the other constituent parts of the optical disk, but is usually about 25 to 300 μm, and preferably about 50 to 200 μm.

The hard coat layer 12 is formed by applying and curing the above-mentioned coating composition, and preferably a coating composition in which the inorganic oxide particles of the reactive particles (A) are silica particles, and which contains the siloxane compound (D). The methods for applying and curing the coating composition have been described above.

The thickness of the hard coat layer 12 is preferably 2 to 20 μm, with 5 to 10 μm being particularly favorable. It will be difficult to obtain the desired surface hardness if the thickness of the hard coat layer 12 is less than 2 μm, but the resulting hard coat film 1 may warp considerably if the thickness of the hard coat layer 12 is over 20 μm.

Because the hard coat film 1 pertaining to this embodiment has the hard coat layer 12, which is produced by curing the above-mentioned coating composition and is thicker than usual, it has sufficient surface hardness and excellent scratch resistance. Also, because the above-mentioned coating composition undergoes little curing shrinkage, warpage of the hard coat film 1 is kept to a minimum.

The hard coat film 1 pertaining to this embodiment comprises the substrate film 11 and the hard coat layer 12, but an adhesive layer may be formed on the opposite side of the substrate film 11 from the hard coat layer 12, and a release sheet may be applied over the adhesive layer.

Optical Disk

Figure 2:
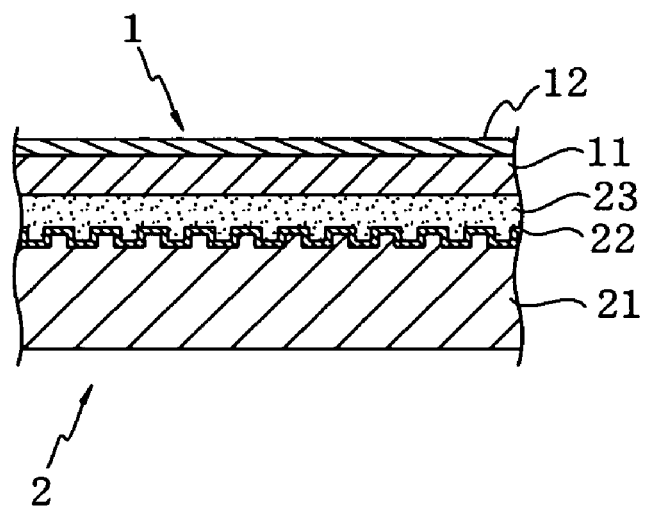
FIG. 2 is a cross section of the optical disk pertaining to an embodiment of the present invention.

As shown in FIG. 2, the optical disk 2 pertaining to this embodiment comprises an optical disk substrate 21 having a concavity-convexity pattern (pits or grooves and lands), an information recording layer 22 formed over the concavity-convexity pattern of the optical disk substrate 21, an adhesive layer 23 formed over the information recording layer 22, and the hard coat film 1 (the hard coat film 1 pertaining to the above embodiment) consisting of the substrate film 11 and the hard coat layer 12 and formed over the adhesive layer 23.

In the manufacture of this optical disk 2, the hard coat film 1 is bonded to the information recording layer 22 of the optical disk 2 via the adhesive layer 23, but since warpage of the hard coat film 1 is kept to a minimum, the bonding of the hard coat film 1 can be carried out more easily, and the hard coat film 1 also adheres well to the information recording layer 22. Furthermore, warpage originating in the hard coat film 1 is also suppressed in the resulting optical disk 2.

Methods for bonding the hard coat film 1 and the information recording layer 22 include a method in which the back of the hard coat film 1 (the side on which the hard coat layer 12 is not present; the same applies hereinafter) or the information recording layer 22 is coated with an adhesive such as ionizing radiation-curable adhesive (including the concept of a pressure-sensitive adhesive; the same applies hereinafter), and the hard coat film 1 and the information recording layer 22 are bonded together; a method in which a pressure-sensitive adhesive layer (pressure-sensitive adhesive sheet) composed of an adhesive agent based on acrylic, urethane, or silicone and having a release sheet is applied to the information recording layer 22 or the back of the hard coat film 1, then the release sheet is peeled off and the hard coat film 1 and the information recording layer 22 are bonded via the exposed pressure-sensitive adhesive layer; and a method in which an adhesive layer and a release sheet are provided ahead of time to the back of the hard coat film 1, the release sheet is peeled off, and the hard coat film 1 and the information recording layer 22 are bonded via the exposed adhesive layer.

Because the optical disk 2 pertaining to this embodiment has the hard coat layer 12 of the hard coat film 1, it has sufficient surface hardness and is resistant to scratching, and warpage is also suppressed, which results in a lower rate of errors due to scratches or warping.

The optical disk 2 pertaining to this embodiment had a configuration of single-sided one-layer type, but may have a configuration of single-sided two-layers type, and there are no particular restrictions on the configuration.

EXAMPLES

The present invention will now be described in more specific terms through examples and so forth, but the scope of the present invention is not limited to these examples and so forth.

Example 1

100 weight parts of a hard coat agent (Desolite Z7524 made by JSR, containing a polymerization initiator, solids concentration: 75 wt %) comprising a mixture of (A) reactive particles produced by chemically bonding an organic compound having at least one polymerizable unsaturated group in its molecule to silica particles and (B) an organic compound having at least two polymerizable unsaturated groups in its molecule, 10 weight parts of (C) a urethane acrylate with a weight average molecular weight of 3500 (UV-7000B made by The Nippon Synthetic Chemical Industry, solids concentration: 100 wt %), and 0.1 weight part of (D) a siloxane compound having a dimethylsiloxane skeleton (SH28PA made by Toray Dow Corning Silicone, solids concentration: 100 wt %) were mixed, and ethyl cellosolve was added as a dilution solvent so that the solids concentration was 40 wt %, which yielded a coating composition. The weight ratio of the solids in the hard coat agent used here was such that reactive particles (A):organic compound (B)=38:62 (as measured by gel permeation chromatography using a Tosoh HLC-8020; column: TSK Guard Column HXL-H, TSK Gel G2500HXL, TSK Gel G2000HXL, TSK Gel G1000HXL).

The coating composition thus obtained was applied to one side of a polycarbonate film (Pure-Ace C110-100 made by Teijin, thickness: 100 μm), used as a substrate film, by a #12 bar coater such that the dry film thickness produced was 5 μm, and this coating was dried for 1 minute at 70° C., after that it was irradiated with UV rays (irradiation conditions: intensity of 310 mW/cm$^2$, amount of radiation: 300 mJ/cm$^2$) to obtain a hard coat film.

Example 2

Other than using 20 weight parts of a urethane acrylate with a weight average molecular weight of 10,000 (UV-3200B made by The Nippon Synthetic Chemical Industry, solids concentration: 100 wt %) as the urethane acrylate, a coating composition was prepared in the same manner as in Example 1. Using the coating composition thus obtained, a hard coat film was produced in the same manner as in Example 1, except that the dry film thickness was changed to 8 μm.

Example 3

Other than using 20 weight parts of a urethane acrylate with a weight average molecular weight of 18,000 (UV-3000B made by The Nippon Synthetic Chemical Industry, solids concentration: 100 wt %) as the urethane acrylate, a coating composition was prepared in the same manner as in Example 1. Using the coating composition thus obtained, a hard coat film was produced in the same manner as in Example 1, except that the dry film thickness was changed to 10 μm.

Example 4

Other than not adding a siloxane compound, a coating composition was prepared in the same manner as in Example 1. Using the coating composition thus obtained, a hard coat film was produced in the same manner as in Example 1.

Comparative Example 1

Other than using 20 weight parts of a urethane acrylate with a weight average molecular weight of 596 (U-4HA made by The Nippon Synthetic Chemical Industry, solids concentration: 100 wt %) as the urethane acrylate, a coating composition was prepared in the same manner as in Example 1. Using the coating composition thus obtained, a hard coat film was produced in the same manner as in Example 1.

Comparative Example 2

Other than not admixing a urethane acrylate, a coating composition was prepared in the same manner as in Example 1. Using the coating composition thus obtained, a hard coat film was produced in the same manner as in Example 1.

Comparative Example 3

Ethyl cellosolve was added as a dilution solvent to 100 weight parts of pentaerythritol tetraacrylate (NKESTER A-TMMT made by Shin-Nakamura Chemicals, containing four polymerizable unsaturated groups), used as an organic compound having at least two polymerizable unsaturated groups in its molecule, so that the solids concentration was 40 wt %, to obtain a coating composition. Using the present coating composition, a hard coat film was produced in the same manner as in Example 1.

Test Example

1. Measurement of Total Light Transmissivity and Haze Value

The total light transmissivity and haze value was measured for the hard coat films produced in the examples and comparative examples, using a haze meter (NDH2000 made by Nippon Denshoku Industries), according to JIS K 7105. The results are given in Table 1.

2. Measurement of Amount of Curl

Each of the hard coat films produced in the examples and comparative examples was cut into a square measuring 100 mm×100 mm to produce a sample. This sample was placed on a horizontal table with the hard coat layer side facing up, the amount of lift from the table was measured at the corners (four points) of the sample, and the total amount of lift for all corners was termed the amount of curl. The results are given in Table 1.

3. Measurement of Amount of Taber Abrasion

The amount of Taber abrasion of the hard coat layer of each of the hard coat films produced in the examples and comparative examples was measured at a load of 1000 g (abrasion wheel: CS-10F) according to JIS K 7204. The results are given in Table 1.

4. Measurement of Pencil Hardness

The pencil hardness of the hard coat layer of each of the hard coat films produced in the examples and comparative examples was measured using a pencil scrape coating film hardness tester (model NP made by Toyo Seiki Seisaku-sho) according to JIS K 5600. The results are given in Table 1.

5. Scratch Resistance Test

The hard coat layer of each of the hard coat films produced in the examples and comparative examples was rubbed back and forth five times at a load of $9.8 \times 10^{-3}$ $N/mm^2$ using #0000 steel wool, after which the layer was examined visually and the scratch resistance was evaluated according to the following criteria.

◯: no scratched
X: scratched

TABLE 1

|  | Ex. 1 | Ex. 2 | Ex. 3 | Ex. 4 | CE 1 | CE 2 | CE 3 |
|---|---|---|---|---|---|---|---|
| Film thickness (μm) | 5 | 8 | 10 | 5 | 5 | 5 | 5 |
| Total light transmissivity (%) | 91.0 | 90.2 | 89.8 | 90.5 | 91.2 | 91.2 | 91.1 |
| Haze value (%) | 0.2 | 0.2 | 0.2 | 0.2 | 0.2 | 0.2 | 0.3 |
| Amount of Curl (mm) | 40 | 39 | 43 | 40 | 97 | 68 | 102 |
| Amount of Taber Abrasion (ΔH) | 14.7 | 17.2 | 15.1 | 16.5 | 14.5 | 15.0 | 23.0 |
| Pencil hardness | HB | H | H | HB | HB | HB | H |
| Scratch resistance | ◯ | ◯ | ◯ | ◯ | ◯ | ◯ | ◯ |

[CE: Comparative Example]

As is clear from Table 1, the hard coat films produced in the examples had good optically transparency, little warpage, and sufficient surface hardness and was resistant to scratches.

INDUSTRIAL APPLICABILITY

The coating composition of the present invention is favorable for forming a hard coat layer on the desired substrate, and particularly a substrate film, and the hard coat film of the present invention is favorable as a protective film of optical products, and particularly optical disks.

The invention claimed is:

1. A coating composition, containing:
   (A) a reactive particle wherein an organic compound having at least one polymerizable unsaturated group in its molecule is chemically bonded to an inorganic oxide particle;
   (B) a monomer or oligomer of an organic compound having at least two polymerizable unsaturated groups in its molecule; and
   (C) an organic compound with a weight average molecular weight of at least 1500 and having at least one polymerizable unsaturated group in its molecule.

2. The coating composition according to claim 1, further containing:
   (D) a siloxane compound having a dimethylsiloxane skeleton.

3. The coating composition according to claim 1, wherein the organic compound (C) is an acrylate.

4. The coating composition according to claim 1, wherein the inorganic oxide particle of the reactive particle (A) is a silica particle.

5. The coating composition according to claim 1, wherein the monomer or oligomer of the organic compound (B) is a monomer or oligomer of a (meth)acrylic ester.

6. A hard coat film, comprising:
a substrate film; and
a hard coat layer with a thickness of 2 to 20 μm, produced by coating at least one side of the substrate film with the coating composition according to any of claims 1 to 5, and curing the coating composition.

7. The hard coat film according to claim 6, wherein the substrate film is an optically transparent film composed of a polycarbonate, a cycloolefin-based polymer or a polymethyl methacrylate.

8. An optical disk, comprising the hard coat film according to claim 6.

* * * * *